No. 864,225. PATENTED AUG. 27, 1907.
J. W. BLODGETT.
TIRE MENDING IMPLEMENT.
APPLICATION FILED SEPT. 23, 1904. RENEWED JAN. 11, 1907.
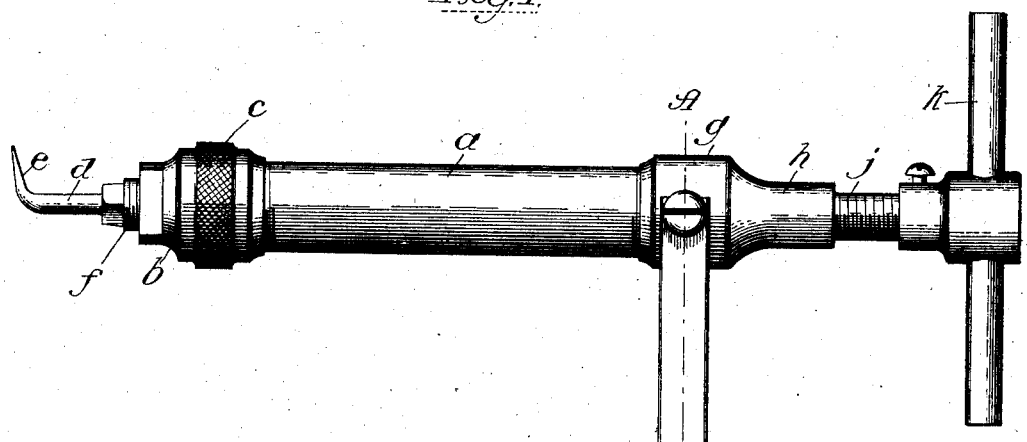
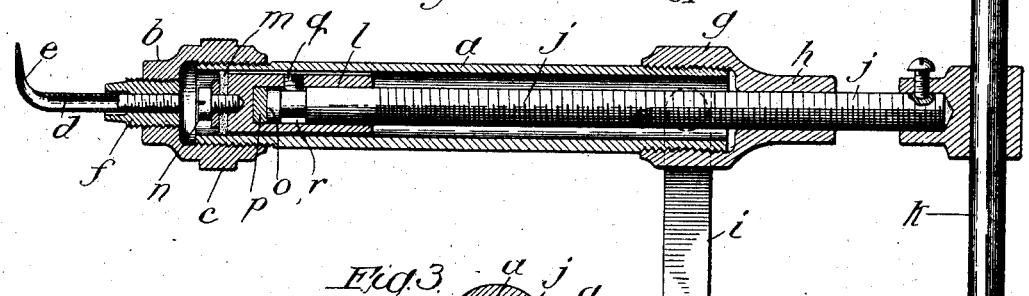
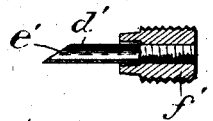

UNITED STATES PATENT OFFICE.

JOHN W. BLODGETT, OF CHICAGO, ILLINOIS, ASSIGNOR TO JOHN HOWARD McELROY, TRUSTEE, OF CHICAGO, ILLINOIS.

TIRE-MENDING IMPLEMENT.

No. 864,225.      Specification of Letters Patent.      Patented Aug. 27, 1907.

Application filed September 23, 1904, Serial No. 225,715. Renewed January 11, 1907. Serial No. 351,899.

*To all whom it may concern:*

Be it known that I, JOHN W. BLODGETT, a citizen of the United States, residing at Chicago, in the county of Cook and State of Illinois, have invented certain new and useful Improvements in Tire-Mending Implements, of which the following is a specification.

My present invention is concerned with a novel implement which I employ in my novel method for mending punctures or leaks in ties and other similar pneumatic articles, as the same is disclosed in my application No. 203,267, filed April 15, 1904.

This novel method involves the forcing into the tire or other article, through the puncture, of an extremely viscid paste composed of uncured rubber or some similar substance as the main ingredient, and allowing it to cure or harden in place, the curing being effected either by the simple exposure of the paste to the air (in which case the paste must be compounded so as to be self-curing), or by the application of a curing liquid to the interior of the tire, which liquid is preferably inserted through the puncture before the paste is forced in.

To illustrate the novel implement which I employ, I annex hereto a sheet of drawings, in which the same reference characters are used to designate identical parts in all the figures, of which,—

Figure 1 is a side elevation of the implement; Fig. 2 is a central longitudinal section through the same; Fig. 3 is a vertical section on the line A—A of Fig. 1; and Fig. 4 is a sectional view through one form of a nozzle which I may employ.

The implement consists of a cylindrical barrel $a$, the outer end of which is closed by the interiorly-threaded cap $b$ screwed thereon, which is preferably provided with the milled periphery $c$ to facilitate its removal for charging the implement. This cap carries the nozzle $d$, which is preferably composed of a tube screwed into the holder $f$, which in turn is screwed into the cap $b$, as shown. The nozzle proper is made of a small tube, and I preferably bend over one end of the tube and cut it off diagonally so that the opening therein will be an elongated oval facing the cap $b$.

I believe this particular form of a nozzle for a tire-mending implement to be broadly new, and I desire to secure the same in connection with any suitable cylinder and piston for forcing the material through the nozzle. For use in some cases, however, I do not need the hooked nozzle shown, in which case I may use the straight form shown in Fig. 4, where $d'$ is the nozzle, composed of a tube and having the opening $e'$ therein made by the diagonal cut across the straight tube. The nut or holder $f$ is preferably squared or flattened at one end in order to apply a wrench thereto readily. The other end of the cylinder $a$ is closed by the cap $g$, which is preferably interiorly threaded so as to be screwed onto the end of the cylinder $a$, and has the reduced extension $h$, which is also interiorly screw-threaded to coöperate with the screw-threaded piston rod $j$.

I preferably provide the implement with a handle $i$ to hold it from turning, if desired, while the piston is being screwed in, and this is conveniently formed of the yoke-shaped piece shown, which is held in place when the cap $g$ is screwed on by means of the screws which may be screwed into the cap $g$, and, if desired, into the cylinder $a$. The piston rod $j$ is forced inward to discharge the load by turning the handle bar $k$. Owing to the viscidity of the paste, it is inadvisable to attempt to turn the piston $l$ with its rod, so that I construct it of the cup having the leather or similar packing disk $m$ secured on its end by the screw $n$ and containing the smooth bearing surface $o$, which is preferably formed on a separate hardened metallic disk $p$ placed in the bottom of the cup $l$, and against which the smooth end of the piston rod $j$ rotates as the paste is forced out. To withdraw the piston for re-charging, a short threaded pin $q$ is screwed through the cup $l$ and into the annular groove $r$, which is wider than the diameter of the pin $q$, and formed near the end of the piston rod $j$.

When the material is to be used, the rod $j$ is screwed back, the cap $b$ is removed, and a charge of the material, which may be wrapped in a little cotton, as described in my foregoing application, or in tin foil, is placed in the cylinder, and the cap $b$ is replaced. I preferably employ the hooked nozzle shown, which is then forced through the puncture, and the charge of paste forced into the tire by screwing in the piston rod, it being preferably given a few turns and then stopped for a short time, and so on for several intervals until enough of the charge is forced into the tire. I preferably keep rotating the barrel slowly, as this first serves to scrape the dirt from the interior of the tire immediately around the puncture, by reason of the shape of the nozzle, and then to spread the material all around the puncture, and finally to form a head on the plug. I preferably employ a pair of these instruments, the first one used having the hooked nozzle, while the second one has the straight nozzle. The straight nozzle one is employed in depositing a self-curing rubber paste plug, which can form a better head to close the aperture than can be done with the hook-shaped nozzle. When enough of the contents of the last implement are discharged, the nozzle is withdrawn slowly, preferably rotating it meanwhile, and when it is entirely out the puncture will be filled so solidly with the paste that the tire (preferably already somewhat inflated during the mending) can be immediately inflated as hard as desired, and the journey resumed.

While I have described my implement as applied to the mending of punctures in pneumatic tires, it will be apparent that it can be applied to curing faults in rubber and similar articles of all descriptions; and while I have shown it as embodied in the form which I at present consider best adapted to carry out its purposes, it will be understood that it is capable of modifications, and that I do not desire to be limited in the interpretation of the following claims except as may be necessitated by the state of the prior art.

What I claim as new, and desire to secure by Letters Patent of the United States, is,—

1. An implement for discharging a viscid compound, consisting of a barrel having an apertured cap on one end and a threaded plug on the other, with a piston moving in said barrel, a threaded piston rod coöperating with said plug, and connections between the piston and its rod to permit of the piston being moved back and forth without rotation, said connections consisting of a bearing surface on the piston against which the end of the rod may turn, an annular channel in the rod near its end, and a pin of less diameter than the width of the channel extending from the piston into said channel.

2. An implement for discharging a viscid compound, consisting of a barrel having an apertured cap on one end and a threaded plug on the other, with a piston moving in said barrel, a threaded piston rod coöperating with said plug, connections between the piston and its rod to permit of the piston being moved back and forth without rotation, and a pair of handles, one on the barrel and the other on the threaded piston rod, for holding the parts for relative movement.

3. An implement for discharging a viscid compound, consisting of a barrel having an apertured cap on one end and a threaded plug on the other, with a piston moving in said barrel, a threaded piston-rod coöperating with said plug, connections between the piston and its rod to permit of the piston being moved back and forth in the barrel without rotation, and a pair of handles, one on the threaded piston-rod and the other on the barrel, the one on the barrel consisting of a U-shaped piece pivoted at its open end to said barrel, substantially as shown.

In witness whereof, I have hereunto set my hand this 19th day of September, 1904.

JOHN W. BLODGETT.

Witnesses:
JOHN H. McELROY,
M. E. SHIELDS.